(12) United States Patent
Walsh et al.

(10) Patent No.: US 12,536,030 B2
(45) Date of Patent: Jan. 27, 2026

(54) SYSTEM AND METHODS FOR PROVIDING INTEROPERABLE NETWORKS AND COMMUNICATIONS

(71) Applicant: Parry Labs, LLC, Alexandria, VA (US)

(72) Inventors: David Walsh, Alexandria, VA (US); Charles Adams, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

(21) Appl. No.: 18/443,570

(22) Filed: Feb. 16, 2024

(65) Prior Publication Data

US 2025/0265106 A1     Aug. 21, 2025

(51) Int. Cl.
    *G06F 9/455*     (2018.01)
    *H04L 9/32*      (2006.01)

(52) U.S. Cl.
    CPC ........ *G06F 9/45558* (2013.01); *H04L 9/3247* (2013.01); *G06F 2009/45587* (2013.01); *G06F 2009/45595* (2013.01)

(58) Field of Classification Search
    None
    See application file for complete search history.

(56) References Cited

U.S. PATENT DOCUMENTS

| | | |
|---|---|---|
| 6,836,888 B1 | 12/2004 | Basu |
| 11,700,241 B2 | 7/2023 | Penton |
| 2014/0095742 A1* | 4/2014 | Guok .................... G06F 3/0613 710/30 |
| 2015/0309789 A1* | 10/2015 | Thorat ................ G06F 9/44521 717/121 |
| 2017/0070971 A1* | 3/2017 | Wietfeldt .............. H04W 24/10 |
| 2019/0373472 A1* | 12/2019 | Smith ..................... H04W 4/70 |
| 2020/0097315 A1* | 3/2020 | Faynberg .............. H04L 9/3263 |
| 2020/0193017 A1* | 6/2020 | Bannister .............. G06F 21/554 |
| 2021/0135690 A1* | 5/2021 | Pehlke ..................... G01S 19/36 |
| 2022/0103599 A1* | 3/2022 | Zheng ................. H04L 41/5054 |
| 2022/0334991 A1* | 10/2022 | Narayanan ........... G06F 12/109 |
| 2022/0377842 A1* | 11/2022 | Wang ..................... H04W 4/70 |
| 2023/0026452 A1 | 1/2023 | Dawkins |
| 2024/0232018 A1* | 7/2024 | Beveridge ................ G06F 8/65 |

FOREIGN PATENT DOCUMENTS

WO     2015/088374 A1     6/2015

* cited by examiner

*Primary Examiner* — Wynuel S Aquino

(74) *Attorney, Agent, or Firm* — Caldwell Intellectual Property Law

(57) ABSTRACT

A system for providing interoperable networks and communications, the system including at least a processor and a memory communicatively connected to the at least a processor, the memory containing instructions configuring the at least a processor to instantiate a software module within a software container, wherein the software module is contained within a virtualized environment, receive a transmission datum from an external environment, modify the transmission datum as a function of a software configuration associated with the software container, wherein modifying the transmission datum includes modifying the transmission datum using a cryptographic process and communicate the modified transmission datum to the software module within the virtualized environment.

20 Claims, 7 Drawing Sheets

SYSTEM AND METHODS FOR PROVIDING INTEROPERABLE NETWORKS AND COMMUNICATIONS

FIELD OF THE INVENTION

The present invention generally relates to the field of computer networking. In particular, the present invention is directed to systems for providing interoperable networks and communications.

BACKGROUND

Current systems and software are generally limited based on the environments in which they are developed and operate. In addition, current systems and software configured for one or more environments are data heavy and require continuous modification.

SUMMARY OF THE DISCLOSURE

In an aspect a system for providing interoperable networks and communications is described. The system includes at least a processor and a memory communicatively connected to the at least a processor, the memory containing instructions configuring the at least a processor to instantiate a software module within a software container, wherein the software module is contained within a virtualized environment. The processor is further configured to receive a transmission datum from an external environment, modify the transmission datum as a function of a software configuration associated with the software container, wherein modifying the transmission datum includes modifying the transmission datum using a cryptographic process and communicate the modified transmission datum to the software module within the virtualized environment.

In another aspect, a system for providing interoperable networks and communications is described. The system includes at least a processor and a memory communicatively connected to the at least a processor. The memory containing instructions configuring the at least a processor to receive a transmission datum associated with a software container and modify the transmission datum as a function of a software configuration associated with the software container, wherein modifying the transmission datum includes modifying the transmission datum using at least a cryptographic process. The processor is further configured to communicate the modified transmission datum to an external environment.

In yet another aspect, a method for providing interoperable networks and communications is described. The method includes instantiating, by at least a processor, a software module within a software container, wherein the software module is contained within a virtualized environment, receiving, by the at least a processor, a transmission datum from an external environment, modifying, by the at least a processor, the transmission datum as a function of a software configuration associated with the software container, and communicating, by the at least a processor, the modified transmission datum to the software module within the virtualized environment.

Invention other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for providing interoperable networks and communications. In one or more embodiments, system includes a computing device. In one or more embodiments, a software container may operate on computing device, such as on a host operating system. In one or more embodiments, system may include a conversion layer to facilitate communications, data and the like between software container and external environments.

Aspects of the present disclosure can be used to implements a software into multiple operating environments. In one or more embodiments, system may allow for communication between two or more devices that cannot ordinarily communicate with one another. In one or more embodiments, system may allow for software to be implemented into multiple operating environments without modification to the software itself. Exemplary embodiments illustrating aspects of the present disclosure are described below in the context of several specific examples.

Figure 1:
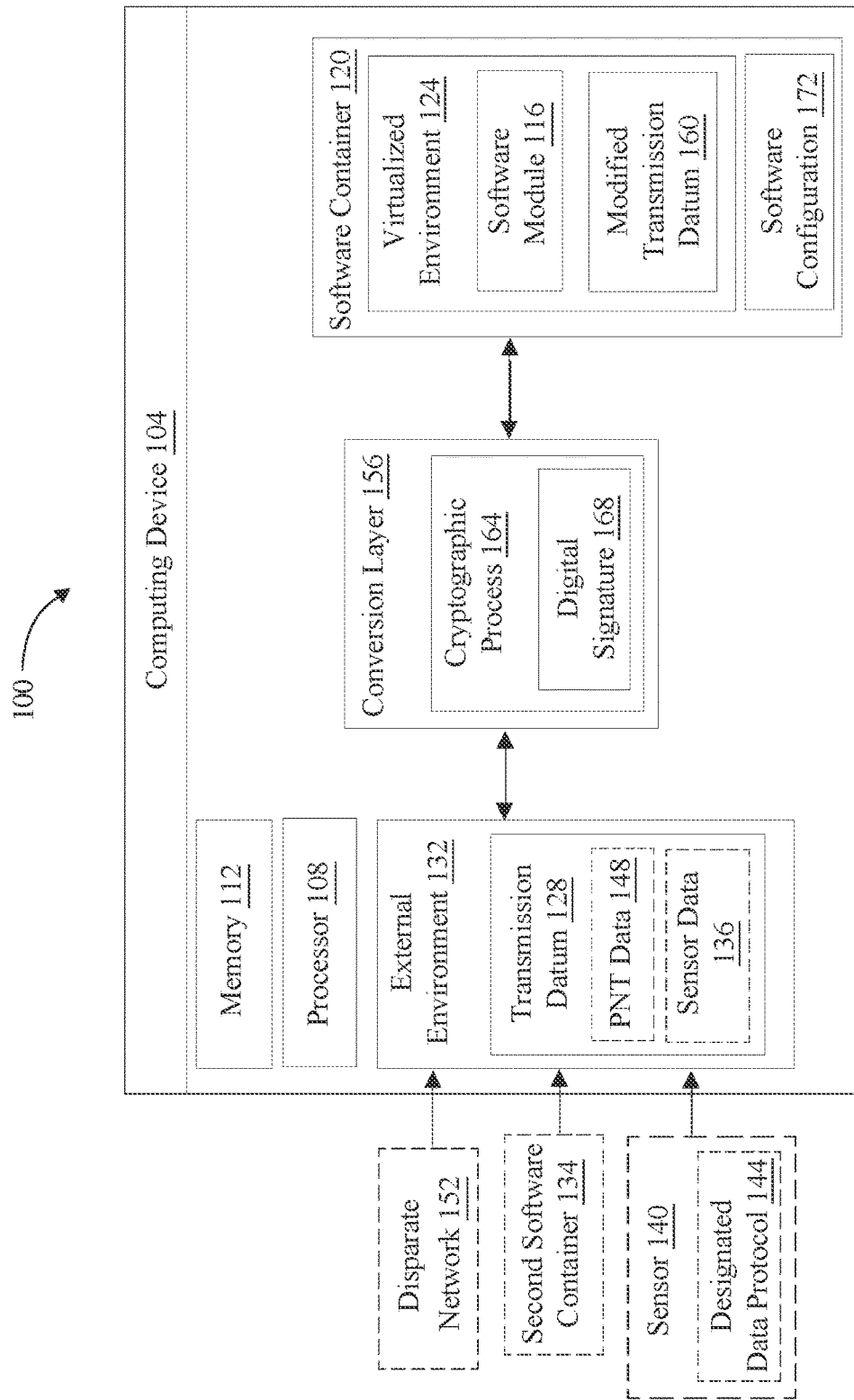
FIG. 1 is a block diagram of an exemplary embodiment of a system for providing interoperable networks and communications.

Referring now to FIG. 1, a system 100 for providing a safety critical operating environment container architecture system is described. System 100 includes a computing device 104. System 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, system 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 108 may access the information from primary memory.

With continued reference to FIG. 1, in or more embodiments, system 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, system 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, system 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, system 100 may include a host circuit. Host circuit may include at least a processor 108 communicatively connected to a memory. As used in this disclosure, a "host circuit" is an integrated circuit or a collection of interconnected circuits designed to manage, control, and/or interface with one or more functionalities in a system 100. In a non-limiting example, host circuit may be configured as a primary platform or base that provides essential infrastructure, resources, and interfaces to facilitate the operation of other connected or integrated components. Hosting circuit may include any computing device 104 as described in this disclosure, including without limitation a microcontroller, microprocessor 108, digital signal processor 108 (DSP) and/or system 100 on a chip (SoC) that provide one or more services, resources, or data to other computing devices. Host circuit may include, be included in, and/or communicate with a mobile device such as a mobile telephone or smartphone. In some cases, host circuit may include but is not limited to, for example, a computing device 104 or cluster of computing devices in a first location and a second computing device 104 or cluster of computing devices in a second location. In other cases, host circuit may include a main unit or a primary circuit in a network that controls communications and/or provide a central point of interface.

With continued reference to FIG. 1, processor 108 is configured to instantiate a software module 116 within a software container 120. A "software module" for the purposes of this disclosure, is an application or software that is sought to be executed. For example, and without limitation, software module 116 may include a web browser, word processing software, a media player, a digital calculator, flight systems software, military software and the like. In one or more embodiments, software module 116 may include an application that is sought to be executed within software container 120. In one or more embodiments, any data and/or information within software container 120 may be used to ensure proper execution of software module 116. In one or more embodiments, software container 120 may contain libraries, dependencies, and the like to ensure proper execution of software module 116. In one or more embodiments, software module 116 may include an executable file. In one or more embodiments, software module 166 may include third party application wherein 3$^{rd}$ party applications may include software and/or application created and/or managed by a differing entity. In one or more embodiments, software module may include previously developed applications wherein the previously developed application are modified to interact with a particular environment. In one or more embodiments, software container may allow for a third-party application and/or previously developed application to be deployed within multiple virtual environments and/or operating system. In one or more embodiments, software module 116 may include a previously developed application and/or 3$^{rd}$ party application wherein software module may be placed within software container to allow for software module to operate within multiple environments. A "software container" for the purposes of this disclosure is an executable package that is capable of running software within an isolated space. For example, and without limitation, software container 120 may include a document drafting software wherein the software container 120 may contain any information, runtime environment and the like necessary to execute the document drafting software on more than one operating systems. In one or more embodiments, software containers 120 may create a virtualized environment 124 wherein a software may run within the virtualized environment 124. "Virtualized environment" for the purposes of this disclosure is a system in which software may be isolated while still operating on a host operating system. For example, and without limitation, software container 120 may operate in a virtualized environment 124 wherein a software within software container 120 may not communicate with the host operating system. In one or more embodiments, software container 120 may allow for OS virtualization wherein a software may be isolated from a host operating system while still sharing the host operating system kernel. "Operating system (OS) level virtualization" for the purposes of this discourse is a system in which an operating system kernel allows the existence of multiple isolated environment. In OS virtualization, a software within software container 120 may not have access to resources of the host operating system. Instead, the software may only have access to the contents within software container 120. "Host operating system" for the purposes of this disclosure is a primary operating system running on processor 108. In one or more embodiments, software container 120 may be executed atop host operating system. In one or more embodiments, virtual operating systems may exist atop host operating system. In one or more embodiments, host operating system may include an operating system configured to allow instantiation of one or more software containers 120, one or more virtual machines and the like. In one or more embodiments, software container 120 may communicate with host operating system to receive resources from processor 108 and/or memory. In one or more embodiments, an ordinary software operating outside of a software container 120 may have access to various operating system resources such as but not limited to, processing capabilities, file systems, networks and the like. In contrast, a software operating within a software container 120 may only have access to the contents within the software container 120. This may include various files, network capabilities and the like. In one or more embodiments, a software within software container 120 may communicate with software container 120 wherein software container 120 may transmit the commands to the processor 108. In one or more embodiments, software container 120 may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container 120 may contain OS level virtualization wherein a software within software container 120 may be executed in a virtualized environment 124. In one or more embodiments, software container 120 may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container 120 may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database, and the like. In one or more embodiments, a software within software container 120 may operate in a runtime environment wherein the software may be isolated from the host operating system. In one or more embodiments, software container 120 may allow for an application to be executed and/or deployed on multiple operating systems. In one or more embodiments, software container 120 may contain libraries, configuration files, binary code and/or any other information that is necessary to execute the application and/or software. In one or more embodiments, a software container 120 may contain some degree of independence from the operating system and/or host system wherein the software container 120 does not rely on the operating system for any information needed to properly deploy an application within software container 120. In one or more embodiments, operating systems may lack the proper functionalities to execute an application, wherein software container 120 may be used to ensure that any necessary functionalities, information, and the like are self-contained. In one or more embodiments, software container 120 may contain a container image, wherein the container image is a portable executable image combined with a manifest that is used by a container manager to deploy the container image on an operating environment with appropriate data services and restrictions. In one or more embodiments, software container 120 may contain restrictions and/or instructions on how a software may communicate with the operating system in which it is deployed on. In one or more embodiments, software container 120 may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools.

With continued reference to FIG. 1, in one or more embodiments, instantiating software module 116 may include extracting software metadata from software module 116 wherein the software metadata may include a plurality of software configuration parameters and a plurality of digital files. As used in this disclosure, "software metadata" is information related to software module 116. In a non-limiting example, software metadata may include a manifest file specifying software version number, required dependencies, configurations and/or the like. As described herein, "software configuration parameters" are parameters that dictate how software module 116 should be set up within a particular software operating environment (SOE). Exemplary software configuration parameters may include, without limitation, one or more environment variables, service endpoints, port numbers, paths to necessary libraries or dependencies, and/or other configuration data necessary for software module to run correctly within virtual environment. In some cases, processor and/or computing device 104 may configure a container manager to initialize at least one container within the virtual environment as a function of plurality of software configuration parameters by preparing container environment i.e., non-preemptible container runtime based on one or more software configuration parameters. This may be done, for example, by setting up correct file paths, configuring virtual network settings, installing required libraries, and/or the like based on plurality of software configuration parameters. Instantiating software module 116 may further include deploying plurality of digital files within the initialized container. As used in this disclosure, "digital files" are a set of files each containing at least a portion of at least one operational rule. In some cases, plurality of digital files may include any files that necessary for the operation of instantiate software module 116, for example, and without limitations, plurality of digital files may include one or more executable files, libraries, scripts, certificates for securities, data files, and/or the like. Container manager may place plurality of digital files in correct directories, setting permission, prepare container agent to execute plurality of digital files. In some cases, container agent may load at least one operational rule into non-preemptible container runtime. In a non-limiting example, at least one operational rule may govern how software image operates within at least one container and second partition virtual environment e.g., interaction with other software applications, utilization of dedicated resources, response to certain events, among others.

With continued reference to FIG. 1, software container 120 may contain one or more dedicated software packages. In one or more embodiments, software container 120 may contain a plurality of dedicated software packages. "Dedicated software package" for the purposes of this disclosure are components that are necessary to execute software module 116. For example, and without limitation, dedicated software package may include a library or a plurality of libraries wherein the libraries contain pre-written code that be called by various software and/or applications such as software module 116. In one or more embodiments, software module 116 may utilize code that has already been written wherein software module 116 may execute prewritten code. In one or more embodiments, dedicated software package may include libraries, dependencies in which the software module 116 relies on to operate and the like. In one or more embodiments, dedicated software packages may be configured to facilitate execution of software module 116. In one or more embodiments, dedicated software package may include various software configurations 172 for software module 116. "Software configuration" for the purposes of this disclosure refer to instructions and parameters that define how the software module 116 should operate. For example, and without limitation, a software configuration 172 may include instructions on how software module 116 may startup, how software module 116 may interact with a network, where data should be stored if any, authorized users. Maximum or minimum CPU requirements, security policies and the like. In one or more embodiments, dedicated software package may further include a runtime environment in which software module 116 is executed within. "Runtime environment" or a "container runtime" for the purposes of this disclosure is a platform that allows software container 120 to be executed on a host operating system. For example, and without limitation, A container runtime may be used to execute software module 116 within software container 120 and configured to provide isolation between software container 120 and the host operating system. In one or more embodiments, a container runtime may be responsible for executing software container 120 and all of its necessary dedicated software packages. In one or more embodiments, container runtime may be situated on a host operating system and configured to execute software container 120. In one or more embodiments, container runtime may provide a platform in which software module 116 may be executed. In one or more embodiments, container runtime may be configured to isolate software module 116 from a host operating system.

With continued reference to FIG. 1, software container 120 may include a container image. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image on an operating environment with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics software, electronic flight bag (EFB) software, ground support equipment software, weather forecasting and reporting software, cockpit display rendering software, and/or the like. In some cases, software image may include a virtual machine image that encapsulate a whole operating system along with one or more preinstalled software applications. Such software may be easily replicated across a plurality of host circuits e.g., servers or cloud environment. In other cases, software image may be used as a backup snapshot to restore/roll back system or a software application to a known working state.

With continued reference to FIG. 1, software module 116 within software container 120 may be instantiated wherein software module 116 may operate within virtualized environment 124. In one more embodiments, instantiation may include selection of a container image. In one or more embodiments, selection of container image may include creation of virtualized environment 124 and execution of software module 116 on and/or within software environment. In one or more embodiments, instantiation of software module 116 may include execution of software container 120. In one or more embodiments, software container 120 may run within an isolated environment wherein software module 116 may run on and/or within software container 120. In one or more embodiments, software container 120 may first create virtualized environment 124 using container runtime and executing software module 116 within virtualized environment 124. In one or more embodiments, instantiation of software module 116 may include selection of an executable file, generation of scripts associated with execution of software module 116 and the like. In one or more embodiments, software container 120 and/or container runtime may utilize container image to create virtualized environment 124 wherein container image may include libraries, dependencies and the like needed to create virtualized environment 124.

With continued reference to FIG. 1, processor 108 is configured to receive a transmission datum 128. "Transmission datum" for the purposes of this disclosure is any information that is transmitted from a software within software container 120 to an external environment 132 or any information that is transmitted from the external environment 132 to the software within software container 120. For example, and without limitation, transmission request may include data received from one or more external environment 132 that has been transmitted to processor 108. This data may include but is not limited to, information received over a network, information received from sensors 140, and the like. In another nonlimiting example, software module 116 may process and/or generate data, wherein the processes and/or generated data may be transmitted to an external environment 132 outside of software container 120. "External environment" for the purposes of this disclosure is an environment located outside of virtualized environment 124 of software container 120. For example, and without limitation, external environment 132 may include the operating system in which software container 120 is operating on, a second software container 120 running on the same or differing operating system as software container 120, a database, a remote device communicatively connected to processor 108, a cloud server, a network, a communication network, a sensing device, and the like. In one or more embodiments, external environment 132 may include a second software container 134. In one or more embodiments, two or more software containers may be operating simultaneously on a single system and/or single host operating system. In one or more embodiments, software containers may interact with one another wherein data may be transmitted to and/or from software containers. In one or more embodiments, external environment may include second software container 134 wherein software container 120 and second software container 134 may communicate with each other. In one or more embodiments, transmission datum 128 may include any information that may pass between software container 120 and external environment 132.

With continued reference to FIG. 1, transmission datum 128 may include a partition policy. A "partition policy," for the purpose of this disclosure, is rules, constraints, and configurations for how a partition (or a virtual machine/container) within virtualized environment 124 accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it's preemptible. In an embodiment, at least a partition policy may define a level of separation between plurality of partitions to ensure that one partition's operation doesn't adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system performance e.g., desired energy efficiency, ensuring that each VM get only the resources it needs.

With continued reference to FIG. 1, in one or more embodiments, transmission datum 128 may include sensor data 136. "Sensor data" for the purposes of this disclosure is any detectable phenomena that has been captured by one or more sensors 140. For example, and without limitation sensor data 136 may include temperatures, speed, velocity, acceleration, humidity, orientation, voltage, watts, and/or the like. In one or more embodiments, one or more sensors 140 may be communicatively connected to processor 108. In one or more embodiments, processor 108 may receive data generated by one or more sensors 140 and generate sensor data 136 and/or transmission datum 128. As used in this disclosure, a "sensor" is a device that is configured to detect an input and/or a phenomenon and transmit information related to the detection. For example, and without limitation, a sensor 140 may transduce a detected charging phenomenon and/or characteristic, such as, and without limitation, temperature, voltage, current, pressure, and the like, into a sensed signal such as a voltage with respect to a reference. sensor 140 may detect a plurality of data. A plurality of data detected by sensor 140 may include, but is not limited to, battery quality, battery life cycle, remaining battery capacity, current, voltage, pressure, temperature, moisture level, and the like. In one or more embodiments, and without limitation, sensor 140 may include a plurality of sensors. In one or more embodiments, and without limitation, sensor 140 may include an optical or image sensor 140 such as a camera, a CMOS detector, a CCD detector, a video camera, a photodiode, a photovoltaic cell, a photoconductive device, a thermal and/or infrared camera, one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 140 may be a contact or a non-contact sensor. Signals may include electrical, electromagnetic, visual, audio, radio waves, or another undisclosed signal type alone or in combination.

With continued reference to FIG. 1, sensor 140 may include a plurality of independent sensors 140, where any number of the described sensors 140 may be used to detect any number of physical or electrical quantities. Independent sensors 140 may include separate sensors 140 measuring physical or electrical quantities that may be powered by and/or in communication with circuits independently, where each may signal sensor 140 output to a control circuit such as a user graphical interface. In an embodiment, use of a plurality of independent sensors 140 may result in redundancy configured to employ more than one sensor 140 that measures the same phenomenon, those sensors 140 being of the same type, a combination of, or another type of sensor 140 not disclosed, so that in the event one sensor 140 fails, the ability of sensor 140 to detect phenomenon may be maintained. In one or more embodiments, one or more sensors 140 may be used to detect the same or similar phenomena. In one or more embodiments, redundant sensors 140 may be used to ensure accuracy of results. In one or more embodiments, sensor data 136 may include data received from redundant sensors 140 wherein inconsistencies within sensor data 136 may indicate a comprised data file and/or innervate sensors 140.

With continued reference to FIG. 1, sensor 140 may be communicatively connected to processor 108 wherein sensor data 136 may be received by a host operating system and/or a differing software container 120 initiated on host operating system. In one or more embodiments, sensor data 136 may be received by host operating system, a differing software container 120, a database, a network connected to host operating system and the like.

With continued reference to FIG. 1, sensor data 136 may contain a designated data protocol 144. "Data protocol" for the purposes of this disclosure is a specific set of rules that govern how data is exchanged between two or more devices. The rules may govern how data is packaged, transmitted and received. For example, and without limitation, data protocol may include Link-16, wherein Link-16 may include a high-speed digital data link in which data is transmitted over an ultra-high frequency band. In one or more embodiments, data protocols may include but are not limited to LINK-16, United States Military standard (MIL-STD), Defense Data network (DDN), Tactical Data Link (TDL), Byzantine fault-tolerant (BFT) protocols, STANAG 4586, Real Application Cluster (RAC), RAC2 and the like. In one or more embodiments, each data protocol may contain a specific set of rules that govern how data can be packaged, transmitted and/or received. In one or more embodiments, data associated with each data protocol may require particular file formats. For example and without limitation, a particular datum may be converted into a geographic information system (GIS) file format in instances in which the datum contains geographical information. "Designated data protocol" for the purposes of this disclosure is a particular data protocol in which a device is configured to follow. For example, and without limitation, sensor 140 may contain Link-16 as its designated data protocol 144 wherein data packaged, transmitted and/or received may adhere to Link-16 protocols. In one or more sensor 140 may contain various hardware and/or software that may be configured to convert raw data received from sensor 140 into sensor data 136. In one more embodiments, sensor data 136 may include data received from sensor 140 that has been converted into a protocol compliant format. "Protocol compliant format" for the purposes of this disclosure is datum that adheres to the rules of a particular data protocol. For example, and without limitation, sensor data 136 may be in a protocol compliant format such that sensor data 136 may adhered to a Link-16 data protocol. In one or more embodiments, sensor data 136 hacking a designated data protocol 144 may include sensor data 136 having a protocol compliant format associated with designated data protocol 144. In one or more embodiments, raw data from sensor 140 may be converted into protocol compliant format such that elements of sensor data 136 may include time stamps, identifiers, and particular file formats. In one or more embodiments, a protocol compliant format may include data that has been segmented into packets to aid in transmission. One or more embodiments, protocol compliant format may include associated metadata wherein the associated metadata may include geographical locations, geospatial coordinates, time stamps, calibration information, sensor 140 information and the like. In one or more embodiments, sensor data 136 may include a digital signature 168, such as any digital signature 168 as described in this disclosure. In one or more embodiments, the digital signature 168 may be used to ensure that sensor data 136 was retrieved from a non-compromised location and/or device. In one or more embodiments, protocol compliant format may include information indicating the classification level of a particular data (e.g. classified, unclassified, top secret, etc.). In one or more embodiments, a protocol compliant format may include a unique identifier associated with the origin of the sensor data 136. For example, and without limitation, a sensor 140 and/or any other device may contain a unique identifier, wherein the unique identifier may be sued to determine the sensor 140 and/or device in which the data has originated from. In one or more embodiments, sensor data 136 may contain a designated data protocol 144 wherein sensor data 136 contains a protocol complaint format associated with the data protocol.

With continued reference to FIG. 1, transmission datum 128 and/or sensor data 136 may include a designated data protocol 144 wherein the information within transmission datum 128 may contain protocol compliant format associated with one or more data protocols as described above. In one or more embodiments, each data protocol may contain a particular set of rules in which data may be packaged and/or transferred. In one or more embodiments, protocol compliant format may include data that has been encrypted. In one or more embodiments, data may be encrypted prior to transmission over a network or between two devices. In one or more embodiments, each data protocol may adhere to a particular encryption process. In one or more embodiments, protocol compliant format may include a datum that has been encrypted. In one or more embodiments, transmission datum 128 may be encrypted prior to transmission to other devices and/or to software container 120. In one or more embodiments, encryption processes may include an Advanced Encryption standard (AES), AES-128, AES-192, AES-256, Secure Sockets Layer (SSL), Rivest-Shamir-Adleman (RSA) encryption, and the like. In one or more data may be encrypted during transmission to and/or from software container 120. In one or more embodiments, a device and/or system transmitting transmission datum 128 may utilize a public key to encrypt transmission datum 128, wherein a device and/or system receiving transmission datum 128 may utilize a private key to decrypt the transmission datum 128.

With continued reference to FIG. 1, transmission datum 128 may further include position, navigation and timing (PNT) data. "Position, navigation and timing data" for the purposes of this disclosure is three distinct sets of information related to the position of an object, navigation from one point to another, and information associated with time. In one or more embodiments, PNT data 148 may include three distinct sets of information associated with precision, navigation, and timing. In one or more embodiments, PNT data 148 may include position data. "Position data" for the purposes of this disclosure is information associated with a person's location and an associated two dimensional/three-dimensional orientation (position). In one or more embodiments, position data may be used to determine the location of an object and/or the orientation of the object. In one or more embodiments, position data may contain information in the form of geospatial units. In one or more embodiments, position data may be referenced to a standard geodic system such as WGS 60, WGS72 and/or WGS 84. In one or more embodiments, PNT data 148 may include navigation data. In one or more embodiments, position data may include accuracy of the data to a particular extent such as but not limited to, accuracy within one foot, one mile, one inch and the like. In one or more embodiments, position data may include the accuracy and/or precision of detectable phenomena within PNT data 148. "Navigation data" for the purposes of this disclosure information associated with a current location, desired position, courses, orientations, or speed (navigation) of an object. In one or more embodiments, navigation data may include directions from a current or desired portion to an end location. In one or more embodiments, navigation data may include an orientation for the directions, such as but not limited to, north, south, east west, and/or combinations thereof. In one or more embodiments, navigation data may include speeds, such as velocity, airspeed, ground speed and the like. In one or more embodiments, navigation data may include a current or desired position and an end position in geospatial units. In one or more embodiments, PNT data 148 may include Time data. "Time data" for the purposes of this disclosure is information associated with the time. In one or more embodiments, time data may include, the current time, the estimated time to reach a location, calculated amount of time that has passed between two events and the like. In one or more embodiments, PNT data 148 may be used for global positioning systems (GPS) wherein GPS May determine the location of an individual, an end location and the amount of time it may take. In one or more embodiments, PNT data 148 may be used for GPS navigation wherein a GPS system may use an individual's current location, end location and position to determine various routes, upcoming turns, and the like. In one or more embodiments, PNT data 148 may be used for aviation navigation wherein an aircraft may be located at a particular point in space and time. In one or more embodiments, PNT data 148 may be utilized for military operations, such as determining locations of targets, determining locations of individuals and the like. In one or more embodiments, PNT data 148 may be used for navigation of various aeronautical devices such as but not limited to, missiles, planes, helicopters, and the like. In one or more embodiments, PNT data 148 may be used for cars trucks, boats, and/or any other moving objects. In one or more embodiments, PNT data 148 may be used for networks such as cellular networks wherein data may be stamped with an origin location and time.

With continued reference to FIG. 1, in one or more embodiments, transmission datum 128 may include PNT data 148, wherein PNT data 148 may be retrieved from a variety of sources. In one or more embodiments, transmission datum 128 may include a plurality of PNT data 148 wherein the plurality of PNT data 148 may include redundant data. In one or more embodiments, redundant data may allow for ensured accuracy in data wherein multiple data points may be collected from multiple sources. For example, and without limitation, position data may be retrieved from multiple sources, such as but not limited to, networks, GPS, sensors 140 and the like to determine position. In one or more embodiments, retrieval from multiple sources may ensure that data is consistent from multiple sources. In one or more embodiments, redundancy may allow for error detection wherein, a set of redundant data elements that are not consistent may indicate an issue. In one or more embodiments, transmission datum 128 may include a plurality of PNT data 148 wherein each PNT data 148 is retrieved from a different source, network and the like. In one or more embodiments, retrieval from multiple sources may allow for data to be generated even when a particular source may not be accessed. For example, and without limitation, in area in which GPS access is denied, PNT data 148 may still be retrieved. In one or more embodiments, a plurality of PNT data 148 may allow for data to be retrieved even in instances in which one or more sources are not available. In one or more embodiments, multiple sources for PNT data 148 may allow for assured position navigation and timing (APNT). "Assured position navigation and timing" for the purposes of this disclosure is a multi-domain system in which PNT data 148 may be received from multiple domains or sources to ensure that data is always received. For example, and without limitation, APNT may use multiple sources of navigation and timing including network, Global Positioning System (GPS), Chip-Scale Atomic Clock (CSAC), terrain referenced navigation, start trackers, and others to form the best, APNT solution based on the aggregated results of all sources. This enables platforms to operate without direct dependence on any single source of PNT data 148, so operations continue where a source is unavailable, such as GPS-denied areas. In one or more embodiments, APNT allows for a reliable counterpart to GPS in instances in which GPS is unavailable. In one or more embodiments, APNT may utilize sonar, Lidar, magnetic frequency, gravity, sensors 140 and the like to determine PNT data 148. In one or more embodiments, PNT data 148 may be received from multiple external environments 132, wherein the multiple external environments 132 may include multiple networks, database, sensors 140, software containers 120, processor 108 and the like. In one or more embodiments, PNT data 148 may be received from multiple external environments 132 wherein processor 108 may be configured to aggregate data from multiple environments to create PNT data 148. In one or more embodiments, processor 108 may be configured to retrieve data in simultaneous order wherein when a first external environments 132 is unavailable, processor 108 may proceed to the second external environment 132. In one or more embodiments, processor 108 may be configured to receive a datum from multiple external environments 132 and aggregate the multiple datum to create transmission datum 128. In one or more embodiments, transmission datum 128 may include data retrieved from multiple external environments 132 and/or disparate networks 152. In one or more embodiments, PNT data 148 may be retrieved from multiple external environments 132.

With continued reference to FIG. 1, transmission datum 128 may include a communication. "Communication" for the purposes of this disclosure is transmitted information from one individual to another. In one or more embodiments, communications may be generated by computing devices 104, systems and such and transmitted to other computing devices 104, systems, and such. For example and without limitation, communication may include textual information that one individual may convey to another, audio recordings, video recordings and the like. In one or more embodiments, communication may include live communications similar to communications received through a telephone call, over a radio, through a smart device and the like. In one or more embodiments, communications may be in a text format, binary format, ASCII text and the like. In one or more embodiments, communication may be received in a variable message format (VMF). In one or more embodiments, communication may be received in a 16-line message format, basic message format and the like. In one or more embodiments, communications may contain various formatting structures such as but not limited to a heading, a text portion, and an ending. In one or more embodiments in a 16-line message format, a message may contain a maximum of 16 lines. In one or more embodiments, communication may be received from one or more external environments 132. In one or more embodiments, one or more external environments 132 may include one or more communication networks. In one or more embodiments, communication networks may include but are not limited to radio communication networks, satellite networks, tactical data links, internet-based communications, Defense data networks (DDN), military satellite communication networks, data link networks and the like.

With continued reference to FIG. 1, transmission datum 128 may be received from one or more external environments 132. In one or more embodiments, elements of transmission datum 128 may be received from differing external environments 132. In one or more embodiments, system 100 may be configured to receive transmission datum 128 continuously wherein each transmission datum 128 may be received from one or more external environments 132. In one or more embodiments, system 100 may be configured to receive transmission data from any external environment 132 and in any file format. In one or more embodiments, external environments 132 may differ in each iteration, wherein a first external environment 132 may be the source of a first transmission datum 128 whereas a second external environment 132 may be the source of a second transmission datum 128.

With continued reference to FIG. 1, external environment 132 may include one or more disparate networks 152. "Disparate network" for the purposes of this disclosure is a network that cannot communicate with software module due to differences in protocols, formats, communication protocols, and the like. For example, and without limitation, a disparate network 152 may contain a network following a particular protocol wherein the disparate network may be unable to directly receive transmissions from software module 116 and/or software container 120. In one or more embodiments, a disparate network 152 may include a network that cannot be connected to and/or is incompatible with software container 120 without an intermediary involved. In one or more embodiments, disparate networks 152 may include computers, software, hardware, operating systems, and the like that cannot communicate with one another. In one or more embodiments, disparate networks 152 may include any two devices that cannot communicate with one another due to differing software and/or hardware configurations, security implementations, data protocols, operating systems, file formats, network protocols and the like. In one or more embodiments, software container 120 may allow for software module 116 to operate in host operating system and/or differing operating systems, however software module 116 may not be able to communicate with external environment 132 due to disparate networks 152, disparate software and the like. In one or more embodiments, system 100 may contain one or more disparate networks 152 wherein software module 116 may not be able to communicate with external environment 132 without an intermediary to facilitate data transfer and communication. In one or more embodiments, disparate networks 152 may include networks that cannot transfer data from one device to another and/or networks in which data transferred through the network cannot be properly read or understood due to issues with various data protocols. In a non-limiting example, in the field of telecommunications, a disparate network 152 may include a voice over internet protocol (VOIP) and a traditional telephonic communication which is routed using physical wires. Continuing, the telephonic communication may transmit information using a circuit switched network whereas VoIP may transmit information using packet switch networks. In one or more embodiments, two disparate networks 152 may not be able to communicate directly with one another. In one or more embodiments, disparate networks 152 may include two devices that cannot communicate directly with one another. In another non limiting example, mobile networks may operate at differing frequencies wherein a device configured for 2G mobile networks may not be compatible with a 5G mobile network. In one or more embodiments, external environment 132 may include a disparate network 152 wherein software container 120 may be connected, and/or capable of being connected to, a first network and external environment 132 may include a second network. In one or more embodiments, a disparate network 152 may include a high-speed digital data link operating in a radio frequency band of 960 megahertz (MHz) to 1215 Mhz.

With continued reference to FIG. 1, in one or more embodiments, a conversion layer 156 (as described in further detail below) may communicate with software module 116 through the use of one or more call functions and/or application program interfaces (API). In one or more embodiments, APIs may be used to pass data, such as but not limited to transmission datum 128, from software module 116 to conversion layer 156 and from conversion layer 156 to software module 116. In one or more embodiments, conversion layer 156 may utilize one or more APIs to receive data to and/or from software module 116. In one or more embodiments, conversion layer 156 may then communicate with one or more networks. In one or more embodiments, conversion layer 156 may communicate with one or more networks using libraries, drivers, network sockets and the like to establish a connection to one or more external environment 132 and/or disparate networks 152.

With continued reference to FIG. 1, transmission datum 128 may be received from one or more disparate networks 152 wherein the one or more disparate networks 152 may include networks having different network protocols, devices having differing data protocols, differing encryption processes and the like. In one or more embodiments, processor 108 may be configured to receive transmission datum 128 from one or more external environments 132. In one or more embodiments, processor 108 may be configured to receive transmission datum 128 from a plurality of external environments 132. In one or more embodiments, processor 108 may be communicatively connected to one or more network components. "Network component" for the purposes of this disclosure is a device that can be used to communicate on or within a network. For example, and without limitation, an ethernet cable may be used to establish an ethernet connection and receive data. In one or more embodiments, network components may include but are not limited to, modems, routers, network interface cards, Wireless network adapters, network switches, fiber optics cables, network bridges, web servers, IoT devices, cellular modems, satellite dishes, transponders, sensor 140 adaptors, Bluetooth devices, USB devices, and/or any component necessary to establish communication with another device or network. In one or more embodiments, processor 108 may be configured to determine one or more disparate networks 152 suitable for connection, wherein processor 108 may be configured to find suitable disparate networks 152 in which computing device 104 may connect to. In one or more embodiments, determining networks suitable for connection may include network detection, configuration of IP settings, configuration of a network stack and the like. In one or more embodiments, processor 108 may receive transmission datum 128 from the networks in which processor 108 is capable of communicating with. In one or more embodiments, processor 108 may connect to any network, radio, and/or device that is available to processor 108 and/or host operating system. In one or more embodiments, transmission datum 128 may be automatically sent by a remote devices, sensor 140 and/or any other external environment 132. In one or more embodiments, transmission datum 128 may be received as a function of a request received from software container 120. In one or more embodiments, software module 116 may request a particular datum from a network, sensor 140, and the like wherein processor 108 may be configured to retrieve transmission datum 128. In one or more embodiments, software container 120 may make a request to receive a datum from external environment 132 wherein processor 108 may be configured to retrieve transmission datum 128 from external environment 132. In one or more embodiments, software module 116 may generate a single request wherein processor 108 may be configured to retrieve transmission datum 128 from multiple external environments 132 and/or disparate networks 152. In one or more embodiments, software module 116 may generate a single request, wherein processor 108 may receive a single datum from one or more disparate networks 152 and aggregate the one or more datum to create transmission datum 128. For example, and without limitation, processor 108 may receive PNT data 148 wherein timing may be received from a chip-scale atomic clock (CSAC) and positioning may be received from a GPS system.

With continued reference to FIG. 1, processor 108 is configured to modify transmission datum 128. In one or more embodiments, modification of transmission datum 128 may generate modified transmission datum 160. "Modified transmission datum" for the purposes of this disclosure is a transmission datum 128 having a different format in comparison to the format in which the transmission datum 128 had been originally received. For example, and without limitation, modified transmission datum 160 may include transmission datum 128 having a differing network protocol, a differing data protocol, decrypted information, information in a different file format and the like. In one or more embodiments, modified transmission datum 160 may include data in a format that may be legible and/or processed by software module 116. In one or more embodiments, software module 116 may not be configured to accept data within various protocol compliant formats. In one or more embodiments, software module 116 may not contain the requisite capabilities to decrypt various data. In one or more embodiments, software module 116 may be configured to receive a distinct set of inputs and generate a distinct set of outputs. In one or more embodiments, a distinct set of inputs may include inputs in particular file formats, inputs adhering particular data protocols, inputs with particular encryptions and the like. In one or more embodiments, software container 120 may operate on a plurality of host operating systems, however software container 120 may not be able to communicate with the plurality of host operating systems. In one or more embodiments, processor 108 may serve as an intermediary between software container 120 and external environment 132 wherein software container 120 may be able to communicate with external environment 132. In one or more embodiments, each host operating system, device, network and the like may adhere to a particular data protocol and/or network protocol wherein transmission datum 128 may adhere to the particular data protocol and/or network protocol. In one or more embodiments, modified transmission datum 160 may include transmission datum 128 that can be read by software module 116.

With continued reference to FIG. 1, in one or more embodiments, processor 108 may utilize a conversion layer 156 to generate modified transmission datum 160 from transmission datum 128. "Conversion layer" for the purposes of this disclosure is a system that is configured to convert data from one format or protocol to another. For example, and without limitation, conversion layer 156 may receive datum in as an analog signal and convert the datum to a digital signal. In another non limiting example, conversion layer 156 may convert a datum having a text-based communication protocol into a datum having a binary based communication protocol. In one or more embodiments, conversion layer 156 may be configured to convert data formats, such as converting code from one formatting language to another. For example, and without limitation, from a binary code format to a python related format. In one or more embodiments, conversion layer 156 may be configured to convert a datum between various data protocols, between communication protocols, between network protocols and the like. In one or more embodiments, conversion layer 156 may utilize character encoding in order to convert characters from one readable format to another. In one or more embodiments, conversion layer 156 may encrypt and/or decrypt data. In one or more embodiments, conversion layer 156 may be configured to validate data, authenticate data, and the like. In one or more embodiments, conversion layer 156 may be configured to receive datum contain a plurality of differing formats and convert them datum into a single unified format. For example, and without limitation, conversion layer 156 may receive data from a plurality of sensors 140 wherein each sensor 140 may contain a differing format and convert the data to a single unified format. In one or more embodiments, conversion layer 156 may be configured for data transformation wherein data may be converted, cleaned and structured into a particular format.

With continued reference to FIG. 1, in one or more embodiments, conversion layer 156 may be included within software module 116 and/or software container 120. In one or more embodiments, conversion layer 156 may include software configuration parameters (As described in further detail below), wherein conversion layer 156 may dictate how a software module 116 should operate. In one or more embodiments, software configuration parameters may indicate the types or protocols, the file formats and the like of software module 116. In one or more embodiments, conversion layer 156 may be included within software module 116 wherein software module 116 may be configured to change parameters associated with inputs and outputs in order to communicate with external environment 132. In one or more embodiments, conversion layer 156 may include libraries, binary encodings and the like that allow software module 116 to interact with external environment 132. In one or more embodiments, executable software that is compiled must rely on additional proprietary libraries and binary encodings needed by the Operating System to load applications into application environments and connect applications to the standard data services called by the utilization of standard APIs. Because of this limitation all software developed must be built and integrated using the same exact OS tools of the same version. In one or more embodiments, conversion layer may contain the necessary libraries, encodings and the like to allow for software module 116 to interact with external environment 132. In one or more embodiments, conversion layer 156 may be configured to modify software module wherein software module 116 may be configured to communicate with external environment 132.

With continued reference to FIG. 1, conversion layer 156 may determine the authenticity, security credibility and/or reliability of data received. In one or more embodiments, data received by and/or transmitted from software container 120 may pass through conversion layer 156 before communicating with external environment 132. In one or more embodiments, conversion layer 156 may ensure that data passing to and/or form external environment 132 is secure. In one or more embodiments, conversion layer 156 may compress and/or decompress data prior to transmission. In one or more embodiments, transmission datum 128 may be initially transmitted by software container 120 and received by conversion layer 156 wherein conversion layer 156 may modify transmission datum 128 and transmit modified transmission datum 160 to external environment 132. Similarly, conversion layer 156 may receive transmission datum 128 from external environment 132, modify transmission datum 128 and transmit modified transmission datum 160 to software container 120. In one or more embodiments, conversion layer 156 may serve as an intermediary between software container 120 and external environment 132 wherein data passing through conversion layer 156 may be modified for the respectable end location.

With continued reference to FIG. 1, conversion layer 156 may modify transmission datum 128 using one or more cryptographic processes 164. In one or more embodiments, conversion layer 156 may include a cryptographic system wherein the cryptographic system is configured to execute one or more cryptographic processes 164. In one or more embodiments, transmission datum 128 may be encrypted, decrypted password protected, digitally signed, examined for a digital signature 168 and the like to preserve the trustworthiness and/or the integrity of software programs. In an embodiment, methods and systems described herein may perform or implement one or more aspects of a cryptographic system. In one or more embodiments, methods and systems described herein may perform one or more cryptographic processes 164, wherein the cryptographic processes 164 include one or more steps within a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems May be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system 100 is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system 100, a prover runs a proving algorithm using the proving key and secret information available to the prover, and a verifier checks the proof using the verification key; public key cryptographic system 100 may include RSA, elliptic curve cryptography, ElGamal, or any other suitable public key cryptographic system 100. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures 168 as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

An "attested boot" for the purposes of this disclosure is system that verifies the reliability of a boot sequence to ensure that an operating system and its own components have not been tampered with. In one or embodiments, computing device 104 may check various digital signatures 168 associated with software container 120 to ensure that software container 120 has not been tampered with. In one or more embodiments, a system such as computing device 104 may refuse to boot the underlying software if the software cannot be verified. In one or more embodiments, conversion layer 156 and/or may be configured to verify a compliance of the software module 116 with a plurality of pre-determined safety standards sourced from a trusted repository by monitoring an adherence of the software module 116 to a pre-defined operational rule within a non-preemptible container runtime. As used in this disclosure, a "compliance" is a data element measuring a conformance of software module 116 to established guidelines or specifications designed to ensure the safety and reliability of software module 116 (especially within environment where failure may lead to significant harm or loss) known as "safety standards." In some cases, compliance may include a quantitative value such as a score or a range of scores. In other cases, compliance may include one or more binary representation, for example, "1" and "0" or "TRUE" and "FALSE," wherein "1/TRUE" may indicate software module 116 is compliant with at least one corresponding safety standard and "0/FALSE" may indicate software module 116 is non-compliant with the at least one corresponding safety standard. A "trusted repository," for the purpose of this disclosure, is a trust entity e.g., a secure storage or even a trusted (third) partition, wherein plurality of safety standards are kept. In a non-limiting example, trust repository may be considered authoritative and tamper-proof e.g., one or more secure databases, version control systems, and/or certified data centers. In an embodiment, conversion layer 156 may be configured to evaluate compliance to ensure that software module 116 may perform all functions specified to at least one operational rule. In a non-limiting example, computing device 104 may be configured to determine a design assurance level classification (DAL) associated with software module 116 design assurance level classification (DAL) based on container runtime behaviors observed by container agent or a record generated and managed by logging mechanism (in real-time or near real-time). In one or more embodiments, conversion layer 156 may measure various data such as data from software module 116, transmission datum 128, data associated with software container 120 and/or software module 116 wherein changes to data size and the like may indicate that a software may have been compromised. In one or more embodiments, inputs and/or outputs of software module 116 and/or transmission datum 128 may be digitally signed wherein data not containing a digital signature 168 may indicate that software module 116 and/or data from external environment 132 may be compromised.

A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature 168 is equivalent to possession of the private decryption key and/or device-specific secret. Likewise, if a message making up a mathematical representation of file is well-designed and implemented correctly, any alteration of the file may result in a mismatch with the digital signature 168; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

Still viewing FIG. 1, in some embodiments, digital signatures 168 may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature 168.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature 168 confirms the identity of the entity and links the file to the entity in a verifiable way. Digital signature 168 may be incorporated in a digital certificate, which is a document authenticating the entity possessing the private key by authority of the issuing certificate authority and signed with a digital signature 168 created with that private key and a mathematical representation of the remainder of the certificate. In other embodiments, digital signature 168 is verified by comparing the digital signature 168 to one known to have been created by the entity that purportedly signed the digital signature 168; for instance, if the public key that decrypts the known signature also decrypts the digital signature 168, the digital signature 168 may be considered verified. Digital signature 168 may also be used to verify that the file has not been altered since the formation of the digital signature 168.

With continued reference to FIG. 1, software programs may include a time-varying software programs, which may have a time limit after which time-varying software programs is no longer valid. Time limit may be calculated from an initial time, which may be a datum linked to a particular timestamp or other value representing a fixed moment in time, associated with time-varying software programs; initial time may be a time of creation, a time of verification, or other significant time relating to validity of time-varying token. Initial time may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, secure timestamp may record the current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using software programs. Additional data may include one or more additional data, including transmission datum 128, that has been received by processor 108. Additional data may be hashed into a Merkle tree or other hash tree, such that a root of the hash tree may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, e.g. transmission datum 128, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, [data store] or other parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

With continued reference to FIG. 1, in one or more embodiments, at least a processor 108 and/or conversion layer 156 may be configured to verify the integrity of data or to ensure that software programs hasn't been tampered with using cryptographic hashes, also referred to by the equivalent shorthand term "hashes." A cryptographic hash, as used herein, is a mathematical representation of data, such as software programs and data thereof, wherein the mathematical representation is produced by a lossy "one-way" algorithm known as a "hashing algorithm." In some cases, hashing algorithm may be a repeatable process; that is, identical data may produce identical hashes each time they are subjected to a particular hashing algorithm. Since hashing algorithm is a one-way function, it may be impossible to reconstruct a lot of data from a hash produced from the lot of data using the hashing algorithm. In some cases, hashing algorithm may include one or more processes that reconstruct the full data from the corresponding hash using a partial set of data from the full data may be possible only by repeatedly guessing at the remaining data and repeating the hashing algorithm; it is thus computationally difficult if not infeasible for a single computer to produce the data, as the statistical likelihood of correctly guessing the missing data may be extremely low. In a non-limiting example, when software programs is sent, a SHA-256 hash of the request may be generated and sent alongside. At least a processor 108 or conversion layer 156 may hash the received configuration request using the same algorithm and check if the hashes match to verify the data integrity.

With continued reference to FIG. 1, cryptographic system may include a zero-trust process. "Zero trust" for the purposes of this disclosure is a system in which no external system is trusted, such that data must always be verified. For example, and without limitation, in a zero trust process every datum received must be independently verified. In one or more embodiments, a zero-trust process may include detection of a digital signature 168, verification of data and the like. In one or more embodiments, in a zero trust process all data may be encrypted prior to transmission and decrypted prior to receipts. In one or more embodiments, any data received from system and/or external environment 132 may first be authenticated prior to receipt. In one or more embodiments, in a zero-trust process, data must first be digitally signed prior to transmission such that a differing system may verify the authenticity of the data. In one or more embodiments, a zero-trust process may include the use of a cryptographic system between any two external environments 132, any devices, and software containers 120 and the like. In one or more embodiments, conversion layer 156 may utilize a zero-trust process wherein conversion layer 156 may first identify a digital signature 168 and modify transmission datum 128 as a function of the digital signature 168. In one or more embodiments, data may not be transmitted through conversion layer 156 in instances in which data cannot be authenticated such that modified transmission datum 160 may be blank and/or may not be generated. modifying the transmission datum 128 as a function of the digital signature 168 may include determining whether transmission datum 128 should be modified and transmitted through conversion layer 156. In one or more embodiments, in instances in which data is transmitted from software container 120, conversion layer 156 may assign digital signatures 168, encrypt data and the like such that a receiving device and/or external environment 132 may verify the authenticity of the data.

With continued reference to FIG. 1, conversion layer 156 may perform one or more cryptographic processes 164 wherein conversion layer 156 may encrypt and/or decrypt transmission datum 128. In one or more embodiments, data transferred to software container 120 may be decrypted whereas data transmitted from software container 120 to external environment 132 may be decrypted. In one or more embodiments, conversion layer 156 may assign a digital signature 168 to transmission datum 128 being transmitted to and/or from software container 120. In one or more embodiments, conversion layer 156 may detect the presence of a digital signature 168 from transmission datum 128 being transmitted to and/or form software container 120.

In one or more embodiments, conversion layer 156 may create one or more virtual networks. In one or more embodiments, software container 120 may connect to a first physical and/or virtual network and external environment 132 may be connected to a second physical and/or virtual network wherein data may be transmitted to and/or from software container 120 through the networks. In one or more embodiments, conversion layer 156 may act as an intermediary between two physical and/or virtual networks wherein data may be transferred between disparate networks 152. In one or more embodiments, conversion layer 156 may allow for communication between one or more systems, software modules 116, devices and the like. In one or more embodiments, the one or more physical and/or virtual networks may include disparate networks 152 wherein multiple networks are connected and capable of communicating through conversion layer 156. In one or more embodiments, conversion layer 156 may be used to connect disparate networks 152 and/or devices that are not connected to similar networks. In one or more embodiments, data may be received from one physical and/or virtual network, wherein data may be modified and transmitted through the second physical and/or virtual network. In one or more embodiments, data may be separated into packets, encrypted, decrypted and the like. In one or more embodiments, one or more cryptographic systems may be implemented wherein data may be authenticated prior to transmission to the second network.

With continued reference to FIG. 1, conversion layer 156 may perform one or more data transformation techniques to modify transmission datum 128. One or more data transformation techniques may include but is not limited to, conversion of data types wherein text may be converted into numerical digits. In one or more embodiments, data transformation techniques may include conversion of a file format. For example, and without limitation data having a .DOC format may be converted into a .TXT format. In one or more embodiments, data transformation techniques may include conversion of various words, phrases, formats and the like to a desired format. In one or more embodiments, conversion may include mapping data elements from a particular file format, data protocol and the like to a desired file format data protocol and the like. In one or more embodiments, elements of transmission datum 128 may be correlated to various elements of a particular file format. For example, and without limitation, each set of words, phrases, commands, code and the like may be mapped and corresponding words, phrases, commands, codes and the like may be retrieved to create modified transmission datum 160. In one or more embodiments, transmission datum 128 may be segmented wherein each segment may be mapped and a resulting of corresponding data element may be retrieved and used for generation of modified transmission datum 160. In one or more embodiments, Conversion layer 156 may receive an input file format and generate a desired file format. "Input file format" for the purposes of this disclosure is the format in which transmission datum 128 has been received. For example, and without limitation, input file format may include a particular file format such as .DOC, .TXT, .PDF and the like. one or more embodiments, input file format may include various formats and/or metadata associated with transmission datum 128. In one or more embodiments, input file format may include but is not limited to, a particular encryption of the data (if any), a particular data protocol, a particular file format, a particular network protocol, a particular way in which data must be formatted, the presence or absence of a digital signature 168 and/or any other information associated with transmission datum 128. In one or more embodiments, conversion layer 156 may generate a desired file format wherein desired file format includes the desired format in which modified transmission datum 160 should be generated. This may include but is not limited to, a particular encryption of the data (if any), a particular data protocol, a particular file format, a particular network protocol, a particular way in which data must be formatted, the presence or absence of a digital signature 168 and/or any other information associated with transmission datum 128. For example, and without limitation, input file format may include a datum having an Internet Protocol version 4 (IPv4) compliant format wherein desired file format may include a datum having an Internet Protocol version 6 (IPv6) format. In one or more embodiments, information within transmission datum 128 and modified transmission may remain the same, wherein the format in which transmission datum 128 and modified transmission datum 160 is transmitted and/or structured may be different. In one or more embodiments, input file format may include a file format of transmission datum 128 wherein desired file format may include a file format for modified transmission datum 160. In one or more embodiments, desired file format may include a file format in which an end recipient and/or software, such as software container 120, is capable of receiving. In one or more embodiments, transmission datum 128 may be contained within a format that is not compatible with an end recipient wherein transmission datum 128 may be modified. In one or more embodiments, software module 116 may operate in an environment wherein devices, software and the like may transmit data with differing protocols, encryptions and the like.

With continued reference to FIG. 1, in one or more embodiments, conversion layer 156 may receive and/or detect input file format and generate modified transmission datum 160 in desired file format. In one or more embodiments conversion layer 156 may use one or more encoding or decoding schemes to generate modified transmission datum 160. In one or more embodiments, conversion layer 156 may receive desired file format and generate modified transmission datum 160 as a function of desired file format. In one or more embodiments, conversion layer 156 may receive transmission datum 128 and detect an input file format. In one or more embodiments, input file format may include designated data protocol 144. In one or more embodiments, one or more sensors 140, devices, software containers 120 and the like may contain a designated data protocol 144 wherein the designated data protocol 144 indicates the particular data protocol that is used, the particular file formats used and the like. In one or more embodiments, determining input file format may include receiving designated data protocol 144 wherein designated data protocol 144 may include elements indicating various portions of input file format. In one or more embodiments, conversion layer 156 may detect input file format through metadata within transmission datum 128. In one or more embodiments, conversion layer 156 may detect input file format through content inspection wherein specific elements of transmission datum 128 may be inspected to determine a correlated input file format. In one or more embodiments, conversion layer 156 may detect input file format through user input. "User input" for the purposes of this disclosure is an input may by an individual interacting with system 100. In one or more embodiments, user input may include the use of a mouse keyboard, interaction through a remote device, interaction through one or more inputs as described in this disclosure and the like. In one or more embodiments, an individual through user input may indicate or create input file format and/or desired file format. Similarly, conversion layer 156 may determine desired file format. In one or more embodiments, desired file format may be received through user input. In one or more embodiments, conversion layer 156 may determine an end recipient such as external environment 132 and/or software container 120 that transmission datum 128 will be transmitted to wherein conversion layer 156 may determine an acceptable file format for the end recipient. In one or more embodiments, the end recipient such as software module 116 and/or external environment 132 may contain meta data and/or any other information which may be used to determine desired file format. In one or more embodiments, conversion layer 156 may be preloaded with various decryption and/or encryption keys wherein conversion layer 156 may be utilized in a plurality of environments. In one or more embodiments, data may be encrypted and/or decrypted differently in various iterations wherein conversion layer 156 may contain the proper data to convert transmission datum 128 to modified transmission datum 160. In one or more embodiments, desired file format may include decryption keys, encryption keys and the like needed to encrypt and/or decrypt transmission datum 128.

With continued reference to FIG. 1, processor 108 and/or conversion layer 156 may be configured to modify transmission datum 128 as a function of a software configuration 172. "Software configuration" for the purposes of this disclosure is information associated with the specific network settings, data settings, options, parameters, and the like of a software that can be used to determine how the software is expected to operate. For example, and without limitation, software configuration 172 may include various network settings wherein the network settings may indicate the networks in which the software is capable of connecting to. In one or more embodiments, software configuration 172 may include preferences, hardware settings, how data is received, how data is output, particular data protocols, network protocols, encryption processes and the like. In one or more embodiments, software configuration 172 may be used to generate input file format and/or desired file format. In instances in which transmission datum 128 is transmitted to software container 120 and/or software module 116 software configuration 172 may be used to generate desired file format. In instances in which transmission datum 128 is transmitted from software container 120 to external environment 132, software configuration 172 may be used to generate input file format. In one or more embodiments, software configuration 172 may be used to determine the configurations of software module 116 that allow for the receipt of data. In one or more embodiments, software configuration 172 may be used to determine the original format of transmission datum 128 and generate modified transmission datum 160. In one or more embodiments, modifying transmission datum 128 may include converting the designated data protocol 144 associated with transmission datum 128 into a data protocol compatible with software container 120. In one or more embodiments, modifying the transmission datum 128 as a function of a software configuration 172 associated with the software container 120 includes converting the designated data protocol 144 using conversion layer 156. In one or more embodiments, designated data protocol 144 may include or be included within input file format and software configuration 172 may be include and/or be included within desired file format wherein transmission datum 128 from sensor 140 and/or any other external environment 132 may be modified to be compatible with software module 116 and/or software container 120. In one or more embodiments, software configurations may further include information associated with interface adaption wherein interface adaptation may include information associated with adapting software module 116 to a particular interface. In one or more embodiments, software configuration 172 may include software dependencies wherein software configuration may indicate various dependencies that software module 116 relies on.

With continued reference to FIG. 1, conversion layer 156 may utilize a machine learning model to receive inputs and generate correlated outputs. In one or more embodiments, a machine learning model may be used to receive transmission datum 128 and generate modified transmission datum 160. In one or more embodiments, the machine learning model may be used to receive inputs and generate correlated outputs. In one or more embodiments, elements of transmission datum 128 may be correlated to outputs wherein the outputs may be aggregated to generate modified transmission datum 160. In one or more embodiments, processor 108 and/or conversion layer 156 may use a machine learning module, such as any machine learning module herein, to implement one or more algorithms or generate one or more machine-learning models, and calculate data as described herein. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, cloud network, server and the like described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Machine learning module may be used to generate a machine learning model and/or any other machine learning model using training data. Machine learning model may be trained by correlated inputs and outputs of training data. Training data may be data sets that have already been converted from raw data whether manually, by machine, or any other method. Training data may be stored in database. Training data may also be retrieved from database. In one or more embodiments machine learning module may include a conversion machine learning module wherein the conversion machine learning module is configured to generate conversion machine learning model. In one or more embodiments, conversion machine learning model may be configured to receive inputs such as transmission datum 128 and generate correlated outputs such as modified transmission datum 160.

With continued reference to FIG. 1, in one or more embodiments, a machine-learning module such as a conversion machine learning module, may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database, such as any database described in this disclosure, or be provided by a user, technician, employee, military personnel and the like. In other embodiments, machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements.

With continued reference to FIG. 1, in one or more embodiments, a machine learning model such as conversion machine learning model may receive inputs such as transmission datum 128 and generate modified transmission datum 160 as outputs. In one or more embodiments, conversion machine learning model may be trained using conversion training data. In one or more embodiments, conversion training data may include a plurality of transmission datum 128 and/or elements thereof correlated to a plurality of modified transmission datum 160 and/or elements thereof. In one or more embodiments, conversion training data may include inputs such as words, phrases, codes, and the like in one particular format correlated to a plurality words, phrases, codes and the like correlated to another particular format. In an embodiments, each input may contain a similar correlated output in a differing format. In one or more embodiments, each elements of transmission datum 128 may be correlated to each elements of modified transmission datum 160. In one or more embodiments, conversion training data may be generated by a user, $3^{rd}$ party and the like. In one or more embodiments, conversion training data may be used to train conversion machine learning model wherein modified transmission datum 160 may be generated as function of conversion machine learning model. In one or more embodiments, conversion machine learning model may be self-trained wherein processor 108 and/or conversion layer 156 may compare inputs and outputs to ensure that the content of the data remains the same. For example, and without limitation, inputs and outputs of conversion machine learning model may contain the same content but contain differing file formats, data protocols and the like. In one or more embodiments, conversion layer 156 may compare inputs and outputs wherein inputs having correct correlated outputs may be used to train conversion machine learning model and inputs having incorrect correlated outputs may also be used to train conversion machine learning model. In one or more embodiments, incorrect inputs and correlated outputs may be used to train conversion machine learning model. In one or more embodiments, conversion machine learning model may be used to receive transmission datum 128 and generate modified transmission datum 160 wherein modified transmission datum 160 includes similar content as transmission datum 128 within a different structure, format, protocol, and the like. In one or more embodiments, conversion machine learning model may be iteratively trained wherein new or unique data sets input into machine learning model may be used to train conversion machine learning model. IN one or more embodiments, conversion machine learning model may be trained to increase latency between inputs and outputs. In one or more embodiments, transmission of transmission datum 128 may be time dependent wherein transmitted data must be communicated within small periods of time. In one or more embodiments, conversion machine learning model may include a plurality of conversion training data wherein each set of conversion training data may contain a particular input file format and a correlated desired file format. In one or more embodiments, processor 108 and/or conversion layer 156 may first select conversion training data from the plurality of conversion training data and generate modified transmission datum 160. In one or more embodiments, training data having less parameters may be utilized to increase latency wherein outputs may be generated quicker.

With continued reference to FIG. 1, in one or more embodiments, processor 108 may be configured to receive transmission datum 128 from one or more external environments 132, modify transmission datum 128 and communicate transmission datum 128 to software container 120. In one or more embodiments, processor 108 may determine one or more external environments 132 based on network capabilities, connected devices and the like. In one or more embodiments, transmission datum 128 may be modified based on software configuration 172 and the like. In one or more embodiments, transmission datum 128 may be modified wherein processor 108 may utilize one or more cryptographic processes 164 to generate modified transmission datum 160. In one or more embodiments, processor 108 may communicate modified transmission datum 160 to software container 120 and/or software module 116. In one or more embodiments, communication may be wired, wireless and the like. In one or more embodiments, Transmitting and/or communicating modified transmission datum 160 may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. In one or more embodiments, software module 116 may be connected to a physical and/or virtual network wherein modified transmission datum 160 may be transmitted through the physical or virtual network. In one or more embodiments, software container 120 and conversion layer 156 may be connected through a first physical and/or virtual network and conversion lawyer and external environment 132 may be connected to a second and/or differing physical and/or virtual network wherein conversion layer 156 may act as an intermediary. In one or more embodiments, processor 108 may communicate the modified transmission datum 160 to the software module 116 within the virtualized environment 124.

With continued reference to FIG. 1, it is to be understood that one or more steps and/or aspects of the present disclosure may occur in differing orders. In one or more embodiments, processor 108 may be configured to receive transmission datum 128 from software container 120, wherein conversion layer 156 and/or processor 108 may modify transmission datum 128 to generate modified transmission datum 160. In one or more embodiments, conversion layer 156 may utilize one or more cryptographic processes 164 to encrypt transmission datum 128, attach a digital signature 168, authenticate transmission datum 128 and the like. In one or more embodiments, software configuration 172 may be utilized as input file format wherein conversion layer 156 may utilize software configuration 172 to determine an initial format. In one or more embodiments, desired file format may be received from external environment 132, user input, designated data protocol 144 and the like. In one or more embodiments, aspects of the present disclosure may be utilized to convert transmission datum 128 received from software container 120 and/or transmitted to software container 120. In one or more embodiments, processor 108 may receive transmission datum 128 associated with software container 120, modify the transmission datum 128 as a function of a software configuration 172 associated with the software container 120, wherein modifying the transmission datum 128 includes modifying the transmission datum 128 using at least a cryptographic process 164 and communicate the modified transmission datum 160 to external environment 132. In one or more embodiments, external environment 132 may include one or more disparate networks 152. In one or more embodiments, external environment 132 may include sensors 140 having designated data protocol 144s. In one or more embodiments, cryptographic process 164 may include encryption, generate of digital signatures 168 and the like. In one or more embodiments, modification of transmission datum 128 may include modification as a function of a digital signature 168.

With continued reference to FIG. 1, an exemplary embodiment of system 100 for providing interoperable networks and communications is described. In one or more embodiments, system 100 includes at least a processor 108 and a memory 112 communicatively connected to the at least a processor 108, the memory 112 containing instructions configuring the at least a processor 108 to receive transmission datum 128 associated with software container 120, modify the transmission datum 128 as a function of software configuration 172 associated with the software container 120, wherein modifying the transmission datum 128 includes modifying the transmission datum using at least a cryptographic process 164. In one or more embodiments, processor 108 is further configured to communicate modified transmission datum 160 to external environment 132. In one or more embodiments, the external environment 132 includes one or more disparate networks 152 and communicating the modified transmission datum 160 to external environment 132 includes determining one or more disparate networks 152 suitable for connection and communicating the modified transmission datum 160 through the one or more disparate networks 152. In one or more embodiments, the external environment 132 includes one or more disparate networks and communicating the modified transmission datum 160 includes transmitting a datum to each of the one or more disparate networks 152. In one or more embodiments, transmission datum 128 includes position, navigation, and timing (PNT) data. In one or more embodiments, one or more disparate networks 152 include a high-speed digital data link operating in a radio frequency band of 960 megahertz (MHz) to 1215 Mhz. In one or more embodiments, external environment 132 includes second software container 134. In one or more embodiments, transmission datum 128 includes sensor data 126 having a designated data protocol 144. In one or more embodiments, sensor 140 may be associated with designated data protocol 144. In one or more embodiments, receiving the transmission datum from the software container includes receiving the sensor data from one or more sensors operating within the software container and modifying the transmission datum as a function of a software configuration associated with the software container includes converting the designated data protocol using a conversion layer. In one or more embodiments, the transmission datum includes a communication and communicating the modified transmission datum to the external environment includes communicating the modified transmission datum through a communication network. In one or more embodiments, cryptographic process includes encryption of the transmission datum. In one or more embodiments, the cryptographic process includes a zero-trust process and modifying the transmission datum using a cryptographic process includes generating a digital signature for the transmission datum.

Figure 2:
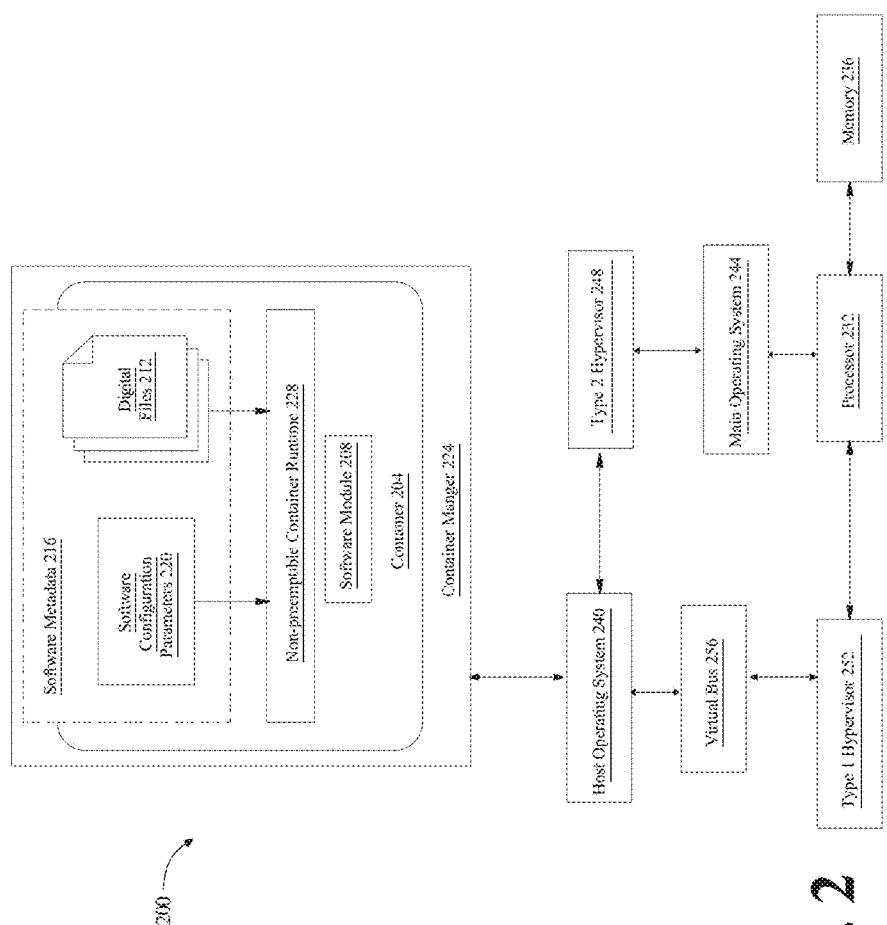
FIG. 2 is a block diagram of a system illustrating a software container in communication with one or more hardware components.

Referring now to FIG. 2, an exemplary embodiments of a system 200 illustrating a container 204 in communication with one or more hardware components is described. Container 204 may include a container such as software container as described in reference to FIG. 1. In an embodiment, a software module 208 may be designed to be reusable and to provide certain functionality that may be integrated into one or more different operating systems or larger software applications. In one or more embodiments, container 204 may allow for software module 208 to be reused on multiple operating systems. In one or more embodiments, container 204 may ensure that any dependencies, libraries and the like needed by software module may be retrieved from within container 204. In one or more embodiments, container may include code, runtime, system tools, system libraries, configurations, and/or the like. In some cases, at least container 204 may provide a "second layer" isolation or protection from a host operating system, environment and other containers and/or partitions. In one or more embodiments, container 2204 may include a standard unit of software that packages up code and all its dependencies such that software module 208 may run under a desired performance from one standard operating environment to another. In one or more embodiments, container contain digital files 212, wherein the digital files 212 contain dependencies, libraries, and/or any other information that may be used to ensure containment of software module 208. In one or more embodiments, instantiating software module 208 into container 204 may include extracting software metadata 216 from software module 208 wherein the software metadata 216 may include a plurality of software configuration parameters 220 and a plurality of digital files 212. As used in this disclosure, "software metadata" is information related to software module 208. In a non-limiting example, software metadata may include a manifest file specifying software version number, required dependencies, configurations and/or the like. As described herein, "software configuration parameters" are parameters that dictate how software module 208 should be set up within a particular standard operating environment (SOE). Exemplary software configuration parameters 220 may include, without limitation, one or more environment variables, service endpoints, port numbers, paths to necessary libraries or dependencies, and/or other configuration data necessary for software module 208 to operate in any virtual environment. In one or more embodiments, a container manager 224 may manage execution of container. In one or more embodiments, container manager 224 may be configured to manage container and ensure that software module 208 operates in an isolated environments. This may be done, for example, by setting up correct file paths, configuring virtual network settings, installing required libraries, and/or the like based on plurality of software configuration parameters 220. Integrating software module 208 may further include deploying plurality of digital files 212 within the initialized container 204. Container manager 224 may place plurality of digital files 212 in correct directories, setting permission, prepare container agent to execute plurality of digital files. In some cases, container agent may load at least one operational rule 122 into non-preemptible container runtime 228, such as a non-preemptible runtime as described above. In cases where container 204 is running at RTOS, certain level of service or response time may be guaranteed. In one or more embodiments, in instances in which container 204 contains a contain-runtime a container manager may not be needed. In a non-limiting example, at least one container 204 may be granted access to at least a processor 232, memory 236, and other resources as described above. Once software module 208 is running, it may have exclusive access to dedicated resources until it completes execution or a conclusion. Exemplary embodiments of at least one container 204 may include a DOCKER container (that encapsulate any payload and dependencies into a single object", RTOS container, safety-certified container (designed to meet stringent certification requirements of regulatory bodies such as, without limitation, FAA or EASA), among others.

With continued reference to FIG. 2, container 204 and/or container manager may communicate directly with a host operating system. In one or more embodiments, in instances in which contain 204 is managed by container manager 224, container manager may communicate with a host operating system 240 wherein the host operating system may transmit the communication to processor 232 and/or memory. In one or embodiments, in instances in which container 204 contains a container-runtime the container run time may communicate with the host operating system 240. In one or more embodiments, the host operating system 240 may include the operating system in which container 204 and/or container manager is running on. In one or more embodiments, host operating system 240 may include a virtual environment located atop a primary operating system and/or a virtual environment in direct communication with hardware components. In one or more embodiments, host operating system 240 may run atop a main operating system 244, wherein the main operating system 244 may include the primary operating system of the computing device and the host operating system 240 may include the virtual environment generated by a virtual machine. In instances in which host operating system may be created atop main operating system 244, a type 2 hypervisor 248 may be used to create a virtualization layer atop main operating system 244. In one or more embodiments, a host operating system 240 may communicate with type 2 hypervisor 248 wherein type 2 hypervisor 248 may communicate with main operating system 244 wherein main operating system may communicate with processor 232 and/or memory 236. In one or more embodiments, in instances in which host operating system does not run atop main operating system 244, type 1 hypervisor 252 may be configured to create a virtualization layer atop the hardware components such as processor and/or memory 236. In one or more embodiments, a virtual bus 256 may allow for communication between host operating system 240 and processor 232. In one or more embodiments, a type 1 hypervisor may allow for increased isolation wherein host operating system 240 may communicate directly with processor. In one or more embodiments, in a type 23 hypervisor, host operating system 240 must first communicate with virtualized components of type 2 hypervisor 248 wherein type 2 hypervisor may communicate with main operating system 244 and finally main operating system 244 may communicate with processor 232.

Figure 3:
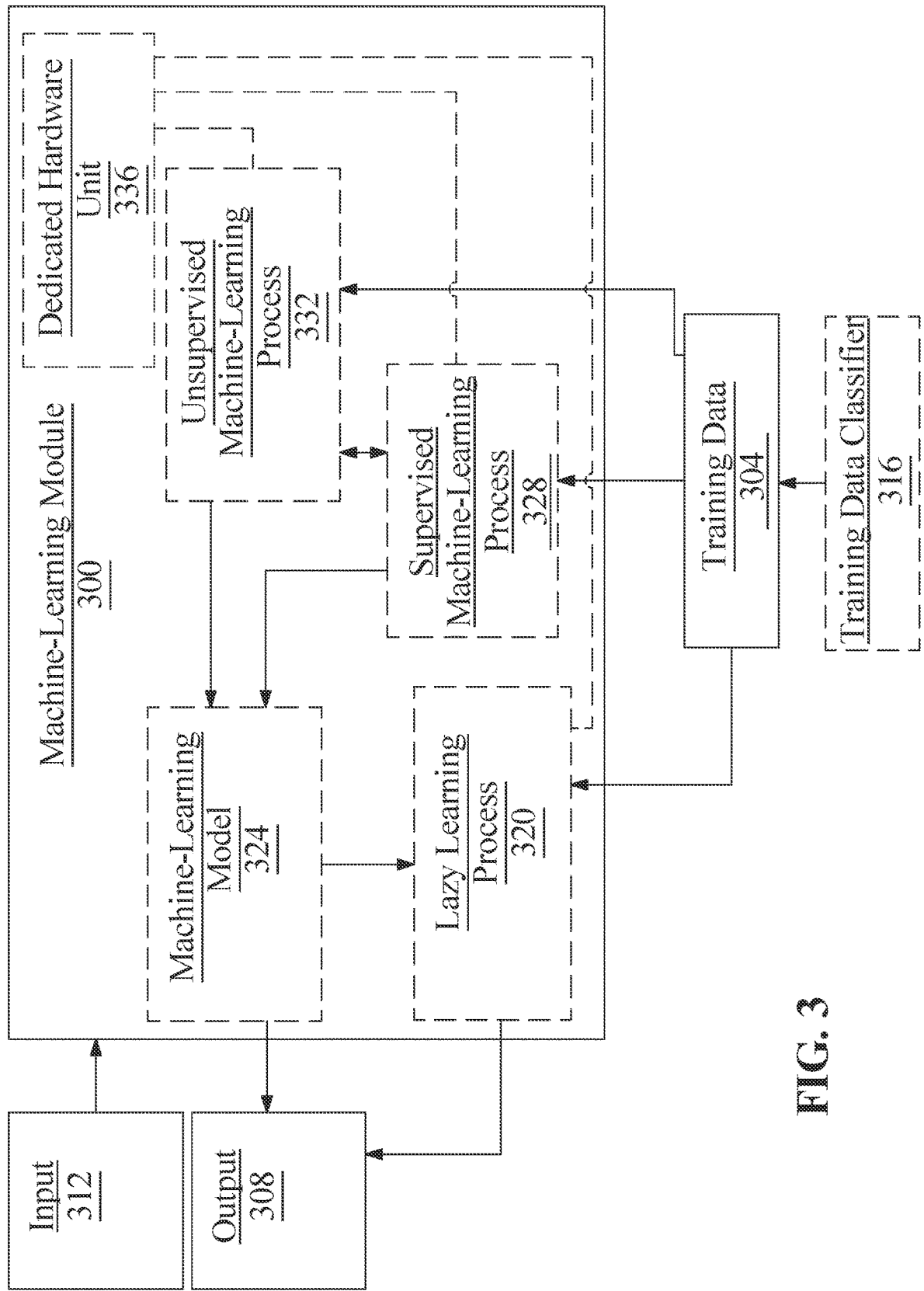
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as transmission datum and outputs may include outputs such as modified transmission datum.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to classes of file formats, classes of data protocols, classes of network protocols and the like. In one or more embodiments, training data may be classified based in the particular format of the input and the correlated format of the output. For example, and without limitation, A datum within IPv4 format may be classified to an IPv4 class.

Still referring to FIG. 3, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include transmission datum as inputs, modified transmission datum as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
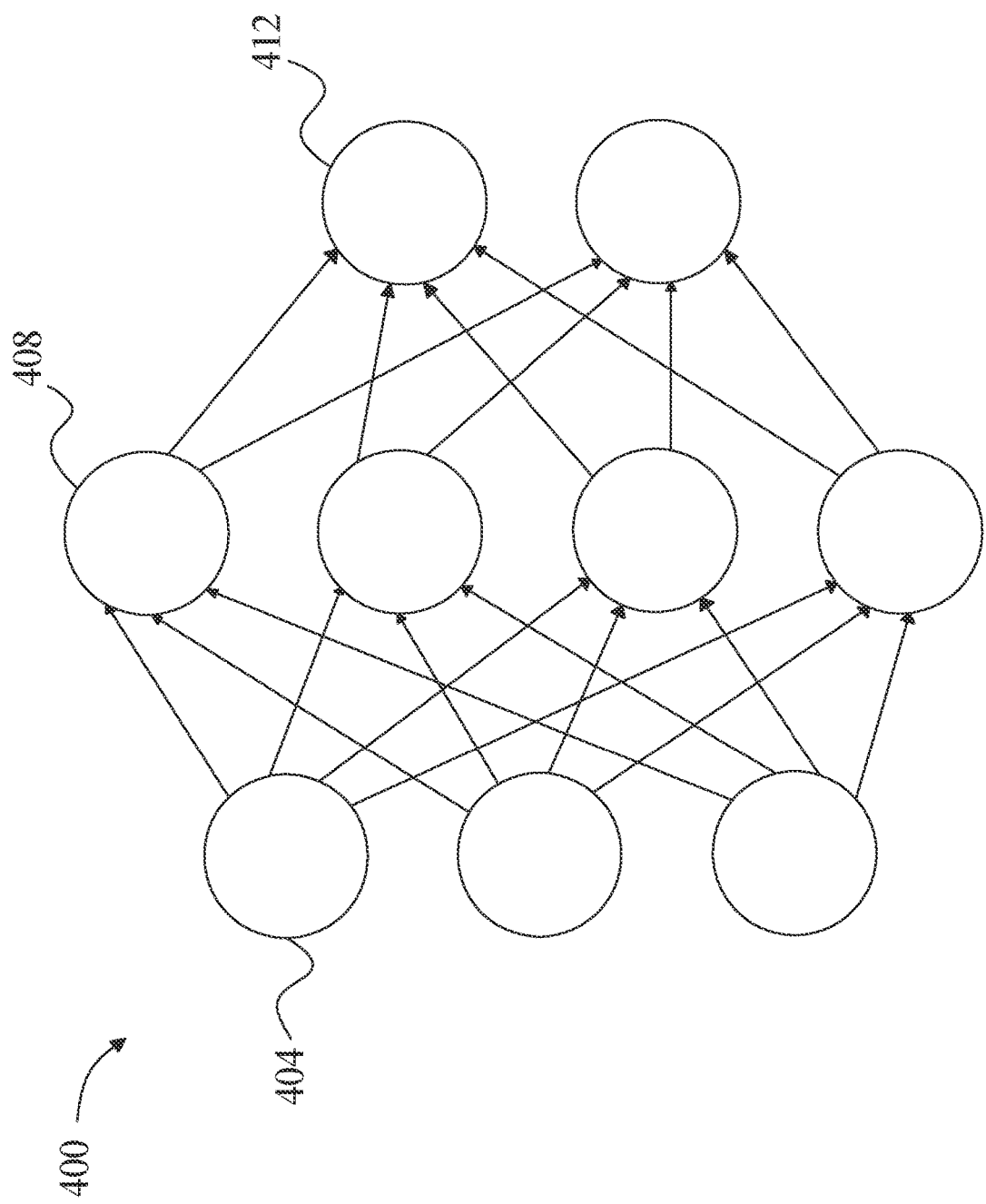
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
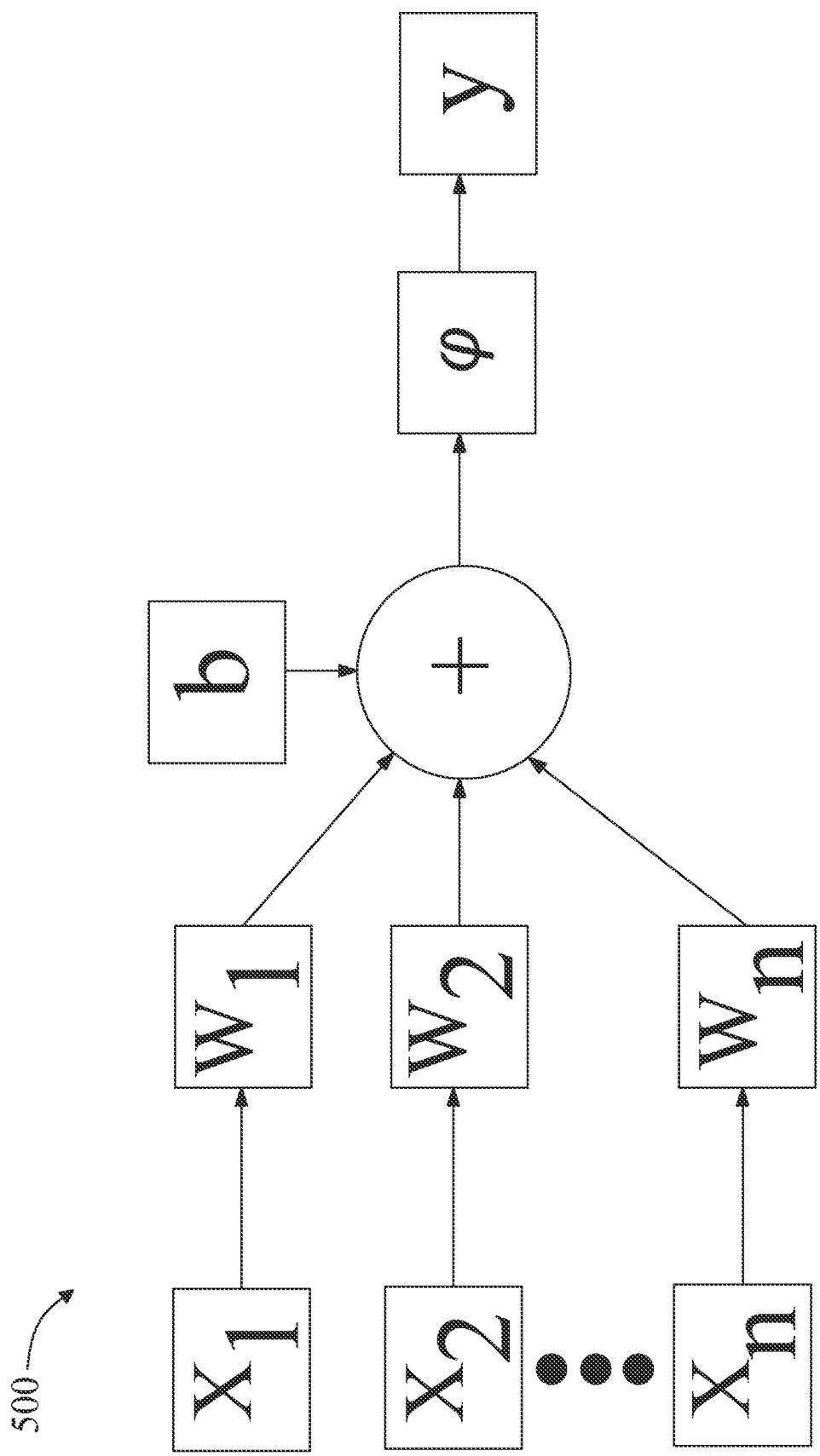
FIG. 5 is a block diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights w; that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
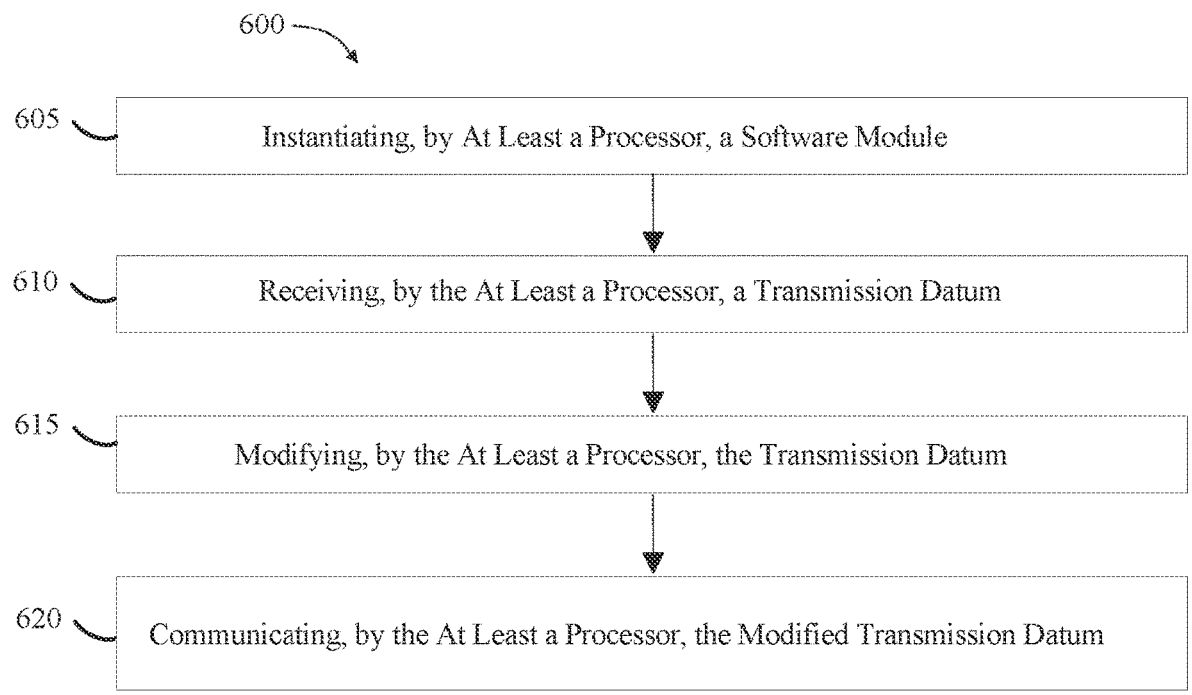
FIG. 6 is a flow diagram illustrating an exemplary embodiment of a method for providing interoperable networks and communications.

Referring now to FIG. 6, a method 600 method for providing interoperable networks and communications is described. At step 605, method 600 includes instantiating, by at least a processor, a software module within a software container, wherein the software module is contained within a virtualized environment. This may be implemented with reference to FIGS. 1-5 and without limitation.

With continued reference to FIG. 6, at step 610, method 600 includes receiving, by the at least a processor, a transmission datum from an external environment. This may be implemented with reference to FIGS. 1-5 and without limitation.

With continued reference to FIG. 6, at step 615 method 600 includes modifying, by the at least a processor, the transmission datum as a function of a software configuration associated with the software container, wherein modifying the transmission datum includes modifying the transmission datum based on the verification. This may be implemented with reference to FIGS. 1-5 and without limitation.

With continued reference to FIG. 6, at step 620 method 600 includes communicating, by the at least a processor, the modified transmission datum to the software module within the virtualized environment. This may be implemented with reference to FIGS. 1-5 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
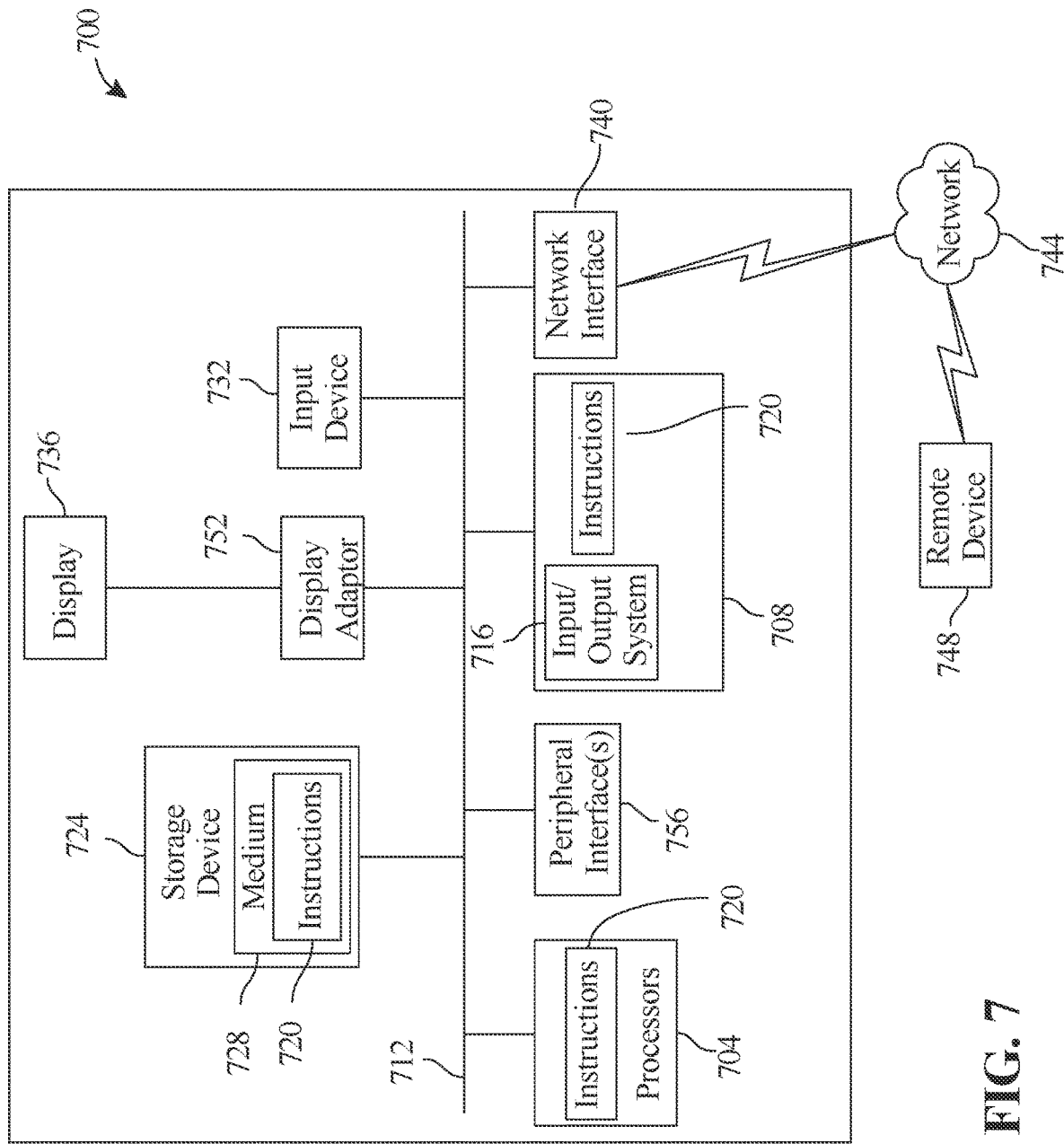
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for providing interoperable networks and communications, the system comprising:
   at least a processor; and
   a memory communicatively connected to the at least a processor, the memory containing instructions configuring the at least a processor to:
      instantiate a container manager, wherein the container manager is configured to initialize at least one software container within a virtualized environment as a function of a plurality of software configuration parameters;
      receive at least a transmission datum from one or more external environments, wherein the at least a transmission datum comprises a partition policy, wherein the partition policy is configured to determine a scheduling policy for a partition based on a priority level of the partition, wherein a handling flight control logic has a highest priority and wherein receiving the at least a transmission datum comprises:
         receive a first datum corresponding to a position of the system from a first external environment and a second datum corresponding to a navigation of the system from a second external environment, wherein the second external environment comprises a physical network and wherein the first external environment and the second external environment differ; and
         aggregating the first datum and the second datum to create the at least a transmission datum;
      modify the at least a transmission datum as a function of a software configuration associated with the at least a software container, wherein modifying the at least a transmission datum comprises modifying the at least a transmission datum using at least a cryptographic process, wherein modifying the at least a transmission datum further comprises:
         utilizing a conversion layer to generate at least a modified transmission datum from the at least a transmission datum wherein the conversion layer generates the at least a modified transmission datum by converting data in a first format to data in at least a second format; and
      communicate the modified transmission datum to the container manager through a virtual network.

2. The system of claim 1, wherein:
   the one or more external environments comprise one or more disparate networks; and
   receiving the at least a transmission datum from the one or more external environments comprises:
      determining one or more disparate networks suitable for connection; and
      receiving the at least a transmission datum from the one or more suitable disparate networks.

3. The system of claim 2, wherein receiving the at least a transmission datum comprises:
   receiving one or more datum from each of the one or more suitable disparate networks; and
   aggregating the one or more datum to create the at least a transmission datum.

4. The system of claim 3, wherein the at least a transmission datum comprises position, navigation, and timing (PNT) data.

5. The system of claim 2, wherein the one or more disparate networks comprises a high-speed digital data link operating in a radio frequency band of 960 megahertz (MHz) to 1215 Mhz.

6. The system of claim 1, wherein at least one external environment of the one or more external environments comprises a second software container.

7. The system of claim 1, wherein:
   the at least a transmission datum comprises sensor data having a designated data protocol;
   receiving the at least a transmission datum comprises receiving the sensor data from one or more sensors communicatively connected to the at least a processor; and
   modifying the at least a transmission datum as a function of a software configuration associated with the at least a software container comprises converting the designated data protocol using the conversion layer.

8. The system of claim 1, wherein:
   the at least a transmission datum comprises a communication; and
   receiving the at least a transmission datum from the one or more external environments comprises receiving the at least a transmission datum from a communication network.

9. The system of claim 1, wherein the cryptographic process comprises decryption of the at least a transmission datum.

10. The system of claim 9, wherein:
    the cryptographic process comprises a zero-trust process; and
    modifying the at least a transmission datum using the cryptographic process comprises:
       identifying a digital signature for the at least a transmission datum; and
       modifying the at least a transmission datum as a function of the digital signature.

11. A system for providing interoperable network and communications, the system comprising:
    at least a processor; and
    a memory communicatively connected to the at least a processor, the memory containing instructions configuring the at least a processor to:
       receive at least a transmission datum associated with a first software container, wherein the at least a transmission datum comprises a partition policy, wherein the partition policy is configured to determine a scheduling policy for a partition based on a priority level of the partition, wherein a partition handling flight control logic has a highest priority;
modify the at least a transmission datum as a function of a software configuration associated with the first software container, wherein modifying the at least a transmission datum comprises modifying the at least a transmission datum using at least a cryptographic process wherein modifying the at least a transmission datum further comprises:
utilizing a conversion layer to generate at least a modified transmission datum from the at least a transmission datum wherein the conversion layer generates the at least a modified transmission datum by converting data in a first format to data in at least a second format; and
communicate, the at least a generated modified transmission datum to one or more external environments, wherein the one or more external environments comprise one or more physical networks and wherein the one or more physical networks comprise one or more disparate networks operating at differing frequencies.

12. The system of claim 11, wherein:
communicating the at least a modified transmission datum to the one or more external environments comprises:
determining the one or more disparate networks suitable for connection; and
communicating the at least a modified transmission datum through the one or more suitable disparate networks.

13. The system of claim 12, wherein communicating the at least a modified transmission datum comprises transmitting at least a datum to each of the one or more disparate networks.

14. The system of claim 13, wherein the at least a transmission datum comprises position, navigation, and timing (PNT) data.

15. The system of claim 12, wherein the one or more disparate networks comprises a high-speed digital data link operating in a radio frequency band of 960 megahertz (MHz) to 1215 Mhz.

16. The system of claim 11, wherein:
the at least a transmission datum comprises sensor data having a designated data protocol;
receiving the at least a transmission datum associated with the first software container includes receiving the sensor data from one or more sensors operating within the first software container; and
modifying the at least a transmission datum as a function of a software configuration associated with the first software container comprises converting the designated data protocol using the conversion layer.

17. The system of claim 11, wherein:
the at least a transmission datum comprises a communication; and
communicating the at least a modified transmission datum to the one or more external environments comprises communicating the at least a modified transmission datum through a communication network.

18. The system of claim 11, wherein the cryptographic process comprises encryption of the at least a transmission datum.

19. The system of claim 11, wherein:
the cryptographic process comprises a zero-trust process; and
modifying the at least a transmission datum using the cryptographic process comprises:
identifying a digital signature for the at least a transmission datum; and
modifying the at least a transmission datum as a function of the digital signature.

20. A method for providing interoperable networks and communications, wherein the method comprises:
instantiating, by at least a processor, a container manager, wherein the container manager is configured to initialize at least one software container within a virtualized environment as a function of a plurality of software configuration parameters;
receiving, by the at least a processor, at least a transmission datum from one or more external environments, wherein the at least a transmission data comprises a partition policy, wherein the partition policy is configured to determine a scheduling policy for a partition based on a priority level of the partition, wherein a partition handling flight control logic has a highest priority and wherein receiving the at least a transmission datum comprises:
receive a first datum corresponding to a position of a system from a first external environment and a second datum corresponding to a navigation of the system from a second external environment, wherein the second external environment comprises a physical network and wherein the first external environment and the second external environment differ; and
aggregating the first datum and the second datum to create the at least a transmission datum;
modifying, by the at least a processor, the at least a transmission datum as a function of a software configuration associated with the at least one software container, wherein modifying the at least a transmission datum comprises modifying the at least a transmission datum using at least a cryptographic process, wherein modifying the at least a transmission datum further comprises:
utilizing a conversion layer to generate at least a modified transmission datum from the at least a transmission datum wherein the conversion layer generates the at least a modified transmission datum by converting data in a first format to data in at least a second format; and
communicating, by the at least a processor, the at least a generated modified transmission datum to the container manager through a virtual network.

* * * * *